US011248921B2

(12) United States Patent
Wang et al.

(10) Patent No.: US 11,248,921 B2
(45) Date of Patent: Feb. 15, 2022

(54) METHOD AND APPARATUS FOR TUNABLE MULTI-VEHICLE ROUTING

(71) Applicant: FORD GLOBAL TECHNOLOGIES, LLC, Dearborn, MI (US)

(72) Inventors: Huizhu Crystal Wang, Bloomfield Hills, MI (US); Joshua Daniel Lyon, Canton, MI (US); Mohammad Abouali, Canton, MI (US); Qianyi Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 16/160,606

(22) Filed: Oct. 15, 2018

(65) Prior Publication Data
US 2020/0116511 A1 Apr. 16, 2020

(51) Int. Cl.
*G01C 21/34* (2006.01)
*G01C 21/20* (2006.01)

(52) U.S. Cl.
CPC ......... *G01C 21/3453* (2013.01); *G01C 21/20* (2013.01)

(58) Field of Classification Search
CPC .............................. G01C 21/3453; G01C 21/20
USPC ....................................................... 701/482
See application file for complete search history.

(56) References Cited

U.S. PATENT DOCUMENTS

| | | | |
|---|---|---|---|
| 8,352,111 B2 | 1/2013 | Mudalige | |
| 8,781,727 B1 | 7/2014 | Bonawitz et al. | |
| 9,494,439 B1 * | 11/2016 | Ross | G05D 1/0022 |
| 9,557,183 B1 | 1/2017 | Ross et al. | |
| 10,248,913 B1 * | 4/2019 | Gururajan | G06Q 10/02 |
| 10,422,654 B2 * | 9/2019 | Moore | G01C 21/20 |
| 10,664,917 B1 * | 5/2020 | Wasserman | G01C 21/3453 |
| 2006/0235739 A1 * | 10/2006 | Levis | G06Q 10/08 705/1.1 |
| 2015/0161752 A1 * | 6/2015 | Barreto | G06Q 10/063114 705/7.15 |

(Continued)

FOREIGN PATENT DOCUMENTS

| | | |
|---|---|---|
| CN | 104808661 A | * 7/2015 |
| CN | 107228668 A | * 10/2017 |

(Continued)

OTHER PUBLICATIONS

Nibras et al., "Multi-Constrained Routing Using Genetic Algorithm," 2013, Publisher: IEEE.*

(Continued)

*Primary Examiner* — Tuan C To
(74) *Attorney, Agent, or Firm* — Michael Spenner; Brooks Kushman P.C.

(57) ABSTRACT

A system includes a processor configured to receive requirement values, from a vehicle-providing entity, for a plurality of predefined tunable routing parameters. The processor is also configured to select and assign entity-associated, routing parameter consideration-levels, based on the values correlated to a predefined schema of consideration-levels for each parameter. The processor is further configured to receive a plurality of pick-up requests and determine, using the entity-associated routing parameter consideration-levels, a routing-plan for a plurality of vehicles to service the requests such that the received values are met.

10 Claims, 5 Drawing Sheets

(56) References Cited

U.S. PATENT DOCUMENTS

| | | | |
|---|---|---|---|
| 2017/0192437 A1 | 7/2017 | Bier et al. | |
| 2017/0254656 A1* | 9/2017 | Bhogal | G01C 21/3484 |
| 2017/0364968 A1* | 12/2017 | Gopalakrishnan | G06Q 30/0283 |
| 2017/0365030 A1* | 12/2017 | Shoham | G06Q 10/02 |
| 2018/0004214 A1 | 1/2018 | Wisniowski et al. | |
| 2018/0101878 A1* | 4/2018 | Marueli | G01C 21/3438 |
| 2018/0224866 A1* | 8/2018 | Alonso-Mora | G06N 5/04 |
| 2018/0231984 A1* | 8/2018 | Alonso-Mora | G06Q 10/0631 |
| 2019/0114564 A1* | 4/2019 | Ferguson | G06Q 10/06312 |
| 2019/0228663 A1* | 7/2019 | Meyers | G08G 1/202 |
| 2020/0064144 A1* | 2/2020 | Tomita | G05D 1/0212 |
| 2020/0066067 A1* | 2/2020 | Herman | G07C 5/008 |
| 2020/0072636 A1* | 3/2020 | Balakrishna | G01C 21/3453 |
| 2020/0096355 A1* | 3/2020 | Mishina | G05D 1/0285 |
| 2020/0117189 A1* | 4/2020 | Kawai | G05D 1/0061 |
| 2020/0164899 A1* | 5/2020 | Yasui | G01C 21/26 |

FOREIGN PATENT DOCUMENTS

| | | | | |
|---|---|---|---|---|
| EP | 1418557 A2 * | 5/2004 | | G06Q 30/0601 |
| EP | 1508890 A1 * | 2/2005 | | G06Q 10/06 |
| GB | 2556399 A * | 5/2018 | | H04L 67/306 |
| JP | 2006003171 A * | 1/2006 | | |
| WO | WO-2015018309 A1 * | 2/2015 | | H04W 4/44 |

OTHER PUBLICATIONS

AJ. Sucec et al., "An Application of Parameter Estimation to Route Discovery by On-Demand Routing Protocols," 2001, Publisher: IEEE.*

* cited by examiner

METHOD AND APPARATUS FOR TUNABLE MULTI-VEHICLE ROUTING

TECHNICAL FIELD

The illustrative embodiments generally relate to methods and apparatuses for tunable multi-vehicle routing.

BACKGROUND

Navigation routes have been available in digital form for over a decade. As a general concept, a user inputs a destination, and the system plans a route from a present location to the destination. This alone is not a trivial solution, as there are potentially thousands, if not millions, of possible routes, when considering every possible alternative.

While modern solutions have adapted to accommodate single vehicles going to single destinations, new models of vehicle usage have begun to emerge. Concepts such as ride-sharing and/or ride-hailing allow individual owners to act as drivers for others. In such solutions, there is an additional accommodation step that needs to be done for choosing which vehicle will service a given request. An easy solution to this problem would just be to select the closest available vehicle, and offer the opportunity, moving outwards towards less-proximate vehicles until a driver accepts. Once there is a one-to-one relationship between the vehicle and passenger, the process can use the existing concepts of route-planning, from where the user was picked up, to where the user will be dropped off.

Even newer models of travel consider a fleet of vehicles servicing a request. In those models there is a significant hurdle realized as people and vehicles are added to the paradigm. For example, two vehicles servicing two customers, and being otherwise agnostic about which vehicle services who, presents four possible solutions for service. Adding a single vehicle moves the solution to eight possible solutions, and adding another customer makes twenty seven possible scenarios. And that is merely considering which vehicles will pick up whom. Once you add additional real-word variables to the problem, a system of, for example, forty vehicles servicing forty customers can have an astronomical number of solutions. Because scaling such systems is non-trivial, and because such systems are more desirable when they can handle volume, significant thought is being spent on attempting to find solutions that are both accommodating of scale and adaptable to constraints.

SUMMARY

In a first illustrative embodiment, a system includes a processor configured to receive requirement values, from a vehicle-providing entity, for a plurality of predefined tunable routing parameters. The processor is also configured to select and assign entity-associated, routing parameter consideration-levels, based on the values correlated to a predefined schema of consideration-levels for each parameter. The processor is further configured to receive a plurality of pick-up requests and determine, using the entity-associated routing parameter consideration-levels, a routing-plan for a plurality of vehicles to service the requests such that the received values are met.

In a second illustrative embodiment, a system includes a processor configured to receive requirement values, from a vehicle-providing entity, for a plurality of predefined tunable routing parameters. The processor is further configured to build a model utilizing the requirement values to constrain modeled routing parameters. The processor is additionally configured to execute the model to refine a planning algorithm until planning results from the planning algorithm fall within the requirement values a predefined percentage of the time and use the planning algorithm to service requests from customers of the vehicle-providing entity.

In a third illustrative embodiment, a system includes a processor configured to receive a pick-up request from a user. The processor is also configured to identify a client to which the user corresponds. The processor is further configured to determine a predefined planning algorithm designated for servicing the client, the algorithm being tuned to client-specified requirements and fulfil the pick-up request using the determined planning algorithm.

DETAILED DESCRIPTION

Figure 1:
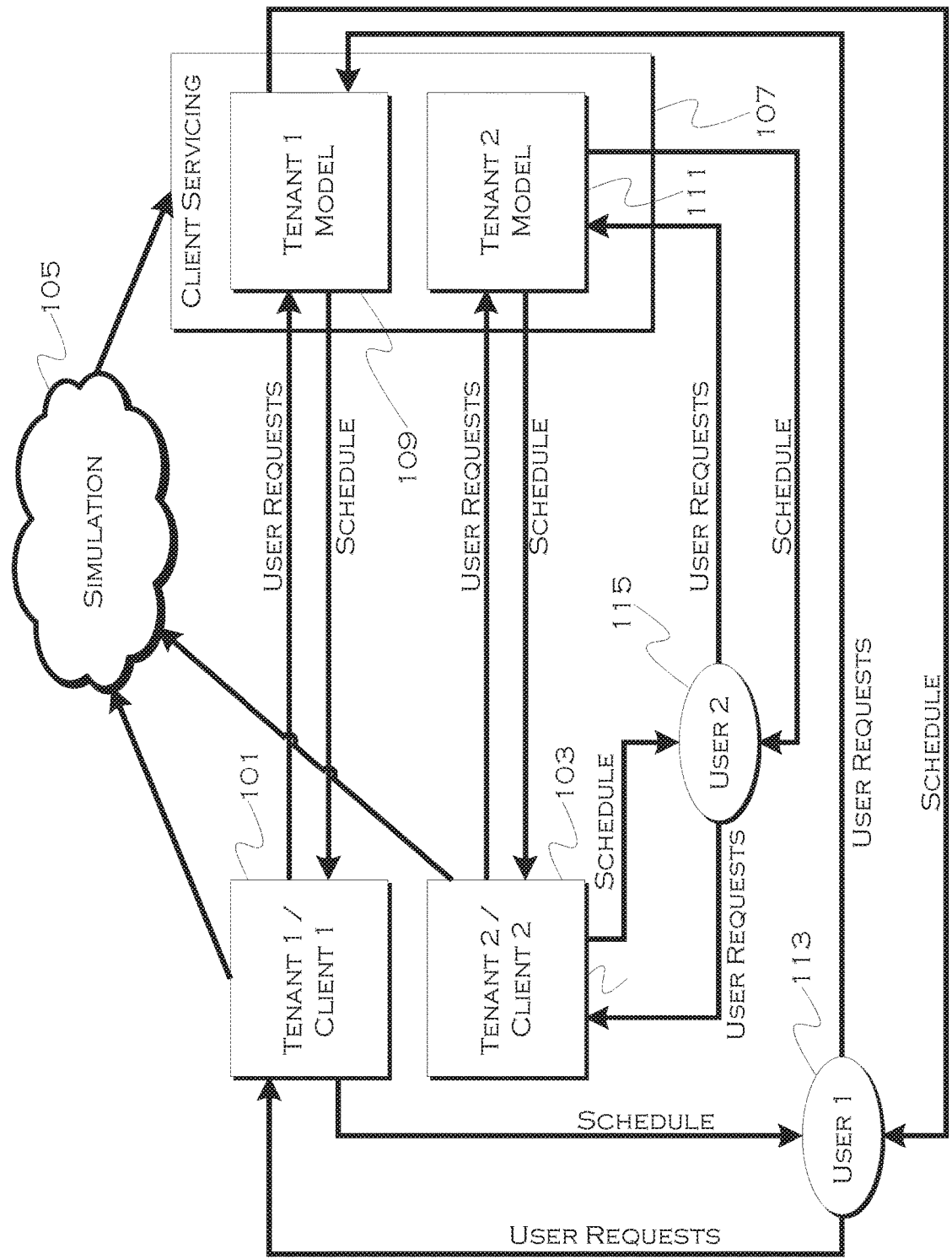
FIG. 1 shows an illustrative routing and route planning system.

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

By providing tunable, on-demand, client-specified solutions, the illustrative concepts and embodiments provide opportunities to improve the utility and functionality of traditional group routing solutions. The novel, uncommon and atypical examples and concepts described herein demonstrate potential improvements achievable through use of those examples, concepts, and the like.

FIG. 1 shows an illustrative routing and route planning system. This is a tunable system in this example, which can accept requests from multiple clients/tenants 101, 103, and provide an adapted algorithm for filling a given client's needs within constraints specified by that client.

In a typical solution, the process may be designed to fulfil a certain model, so that an exemplary ride-sharing company U, might have a preprogrammed model designed to accommodate parameters as company U sees fit. This may provide a nice solution for U, but might be unsuitable for another similar company, L, which may have different constraints or a different model.

In the illustrative example, both U and L could be client1 101 and client2 103, and could provide varied sets of constraints. In this example, the constraints are within a bounded set of accommodatable parameters, defined by the manager of the backend 107. So, for example, the client could be given options for, non-exhaustingly, maximum wait times, ability to deny a request, maximum load times, on-demand and/or preplanning requirements, etc.

In this example, each client would specify the constraints, so, to follow the non-limiting example, client1 might specify maximum of 10 minutes wait time, no rejections and 10 minutes maximum load times. Client2, on the other hand, might specify maximums of 5 minutes wait, but up to 2 percent of requests can be denied. This would be a more efficient service, but with possibility of request-denial. Given the complexities of routing, these could be largely different looking solutions, with a sorting algorithm that planned routes for, for example, 100 vehicles and 500 customers, in a wholly different approach.

In the illustrative example, the system receives the constraints and builds a simulation 105 of the system, which allows the system to adaptively develop a specialized algorithm that meets the particular constraints of a given client. If the constraints change, the algorithm can be rebuilt via simulation. By not having to reprogram the whole solution and/or rely on trial and error (achieved by the simulation, for example), the system can adaptively accommodate the needs and requests of a variety of potential clients, even if those requests/constraints vary wildly.

Once a model is built for a given client, the system can store model for the client. These models 109 and 111, in this example, will fill requests and perform route-planning for the customers of the varied clients. As the system receives requests, it can build a complex plan and schedule for the requests, which can be sent back to the client and/or customer, allowing for fleet management of multiple differently constrained fleets through a single solution.

In this example, a user1 113 of client1, can send a request directly to the client (for relay to the backend 107) or to the backend itself. The same is true for user2 115. The backend has a model saved for each client, and will fill the user1 request using the client1 model, and the user2 request using the user2 model. Thus, the system avoids requiring a custom-programmed solution for each client, instead achieving customization through simulation-tuning done based on client-specified constraints. As the system improves and new parameters can be accommodated by the modeling, each client can specify constraints for the parameter if desired, and each client can have a modified, different (from each other) custom solution without having to rebuild the software from the ground up.

Figure 2A:
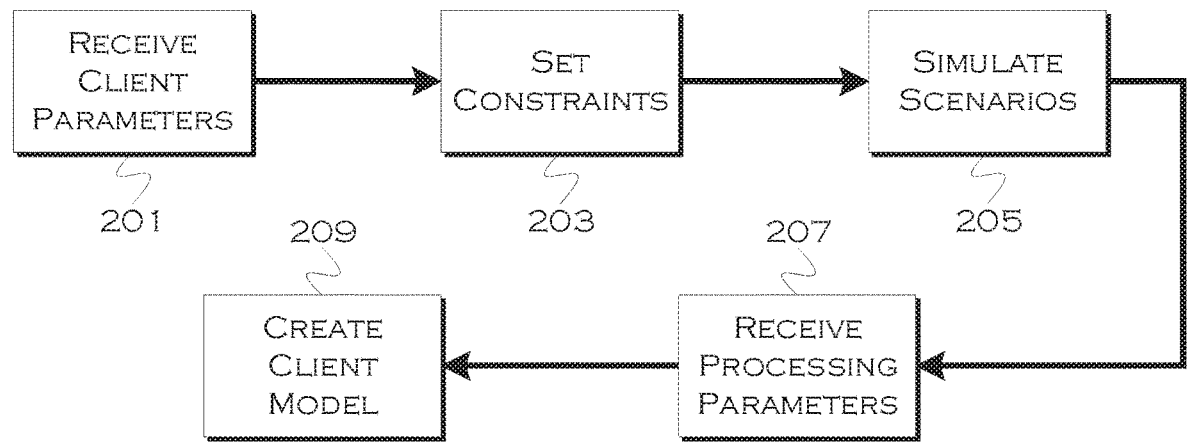
FIG. 2A shows an illustrative example of a constraint-reception process.

FIG. 2A shows an illustrative example of a constraint-reception process. In this example, a client is given a list of constrainable parameters, so that the backend can work within the parameter set which the modeling can accommodate. These parameters can include, but are not limited to, travel distance, distance between stops, capacity, special request handling (e.g., wheel chairs), maximum load times, on-demand and/or scheduled requests, current location and/or walkable location requests, walking distance, wait times, change window, etc.

For many of these parameters, the client selection will be either yes/no (do or do not accommodate) and/or a defined maximum or minimum. A binary request would be one such as, for example, can the vehicles accommodate wheel chairs. Since such requests usually involve specialized vehicles and longer load times, and may also come with legal constraints about waiting times and ability to deny requests, a given client may have to decide if their business model should accommodate such requests. In another example, specifying the ability to service on-demand requests can increase wait times for scheduled customers, so the client may only want to accept scheduled customers.

From just these two parameters, it can be appreciated how complex the solution can be with only a few constraints, and why many companies would elect to either adapt their business models to vendor-specified service solutions, to the extent they can even be found, or to build a specific model for their line of business. Using the illustrative system, however, clients can vary choices and even change models without having to find a new vendor or build new software or modules from the ground up.

An example of maximums might include wait times or load times, wherein expected load-times are used as a proxy until a customer's real load time is known (through observation). Thus, one client could say that it is acceptable for planning to include up to a 10 minute delay from a requested pick-up time, whereas another may set the maximum at 5 minutes. The second solution would probably require more request denials, so the client will have to determine which is more desirable for their given business model. An example of minimums might include a minimum distance traveled, to avoid servicing overly local requests for a trip of X miles or less.

In this example, the process receives 201 client parameter values, which define the constraints that a given client wants to place on the predefined parameters. The system then places constraints on those parameters, for modeling purposes, for example, and begins to simulate 205 possible request and fulfillment solutions. By simulating a large number of request and fulfilment scenarios, which meet the clients constraints, the system can begin to find an adapted solution that does not necessarily have to consider the 10s of trillions of trillions of trillions (etc) of solutions that arise each time a request in a highly complex system occurs. Instead, the system can refine a search and fulfilment algorithm that meets the particular constraints, by, for example, foreclosing search and consideration parameters that result in out-of-bounds solutions.

The simulator can then supply the solution, and the backend (where the simulator may also reside) receives 207 the particular search and fulfilment strategy for the given client, and thus can create 209 a client solution for that particular client. This is the solution that the backend can then use when fulfilling requests from the users of the given client.

Figure 2B:
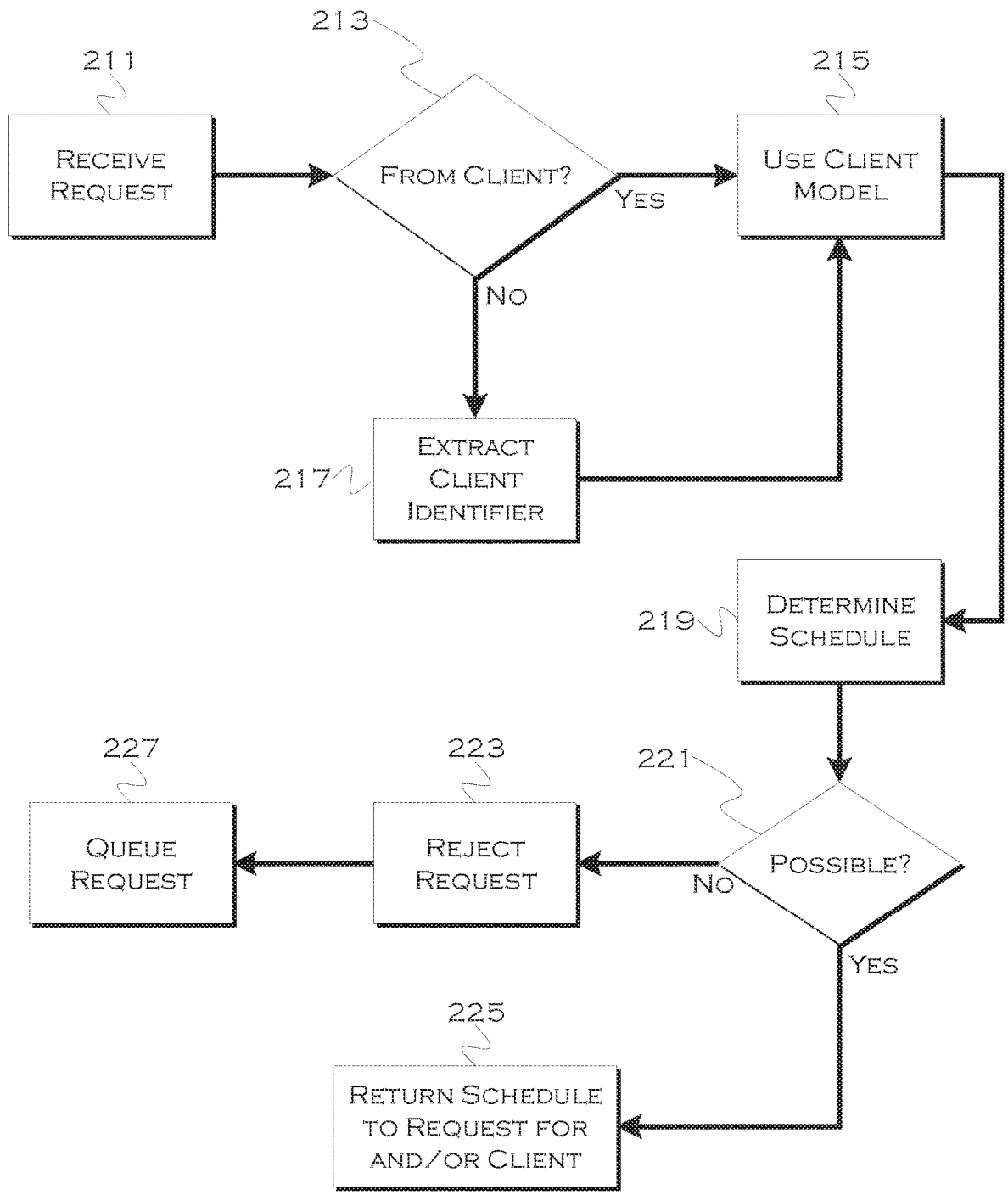
FIG. 2B shows an illustrative request-servicing process.

FIG. 2B shows an illustrative request-servicing process. In this example, the system receives 211 a request from either the client or directly from a user. The system can decide the source 213 of the request, which may result in changes as to where an eventual plan or response is sent (E.g., direct client requests are sent back to the client, user requests may result in a solution being sent to both the user and the client, who is potentially still responsible for providing transportation according to the eventual schedule).

If the request is from a user directly, the process may extract 217 a client-identifier that identifies a particular client, so the process can know which fulfilment model to use on the back-end. The process then selects the fulfilment model that has been built for the particular client and determines 219 a schedule that will accommodate the request. This can include, for example, tasking a new vehicle with pickup instructions for a user request or adding a stop to a current existing pickup schedule that already exists. This can also require reshuffling of other schedules to accommodate the new stop, which again is why it is not trivial to simply scale existing one-car solutions. If vehicles traveled at unlimited speed, had unlimited capacity and were infinitely available, this might be an easier solution, but since systems will be constrained by all three of the preceding, efficient and effective utilization of resources to fulfil requests under a given set of client constraints will require a solution that works for those constraints.

If request fulfilment is possible (assuming the client has set an acceptable rejection threshold not yet exceeded) 221, the process can return a new schedule, including servicing of the present request, to both the client and/or the requesting user. The process may simply return a pickup time or window to the user, and may return one or more new vehicle plans/schedules to the client.

Even if a request cannot be fulfilled, the process may have reached a limit on request denial, so the process may have to either exceed that limit or change a previous approval to a denial. The willingness of a client to do this can be parameterized, and in some cases the request may have to add some additional delays to other stops, if no further requests can be denied. A client may not count a new pickup time as a denial, and FIG. 5 discusses an illustrative solution that provides alternative pickup times resulting in eventual request fulfilment. In other examples, the process may ask a user to walk a certain distance in order not to reject the request.

If the request cannot be fulfilled (and/or if no alternative times are available or selected), the process may queue 227 the request, which can allow for alternative later-fulfilment if certain resources become available or if routes are adjusted to rebalance loads, making pick-up a reality. The client could even parameterize credits or other refunds/ discounts if possible, so certain customers may be willing to trade incentives for taking alternative solutions that do not meet their initial requests. In still further examples, customers may have access to tiers of service, with certain tiers having different constraints. The system can accommodate such models by, for example, providing a solution model for each tier as though it was an individual client, wherein the resources available to solve the routing issue may vary in accordance with the usage of those resources by a higher tier of service. This too could result in deviation from an initial plan for a lower-tier customer if a higher-tier customer needed the resource and no other resources were available to fulfil the higher-tier request.

Figure 3:
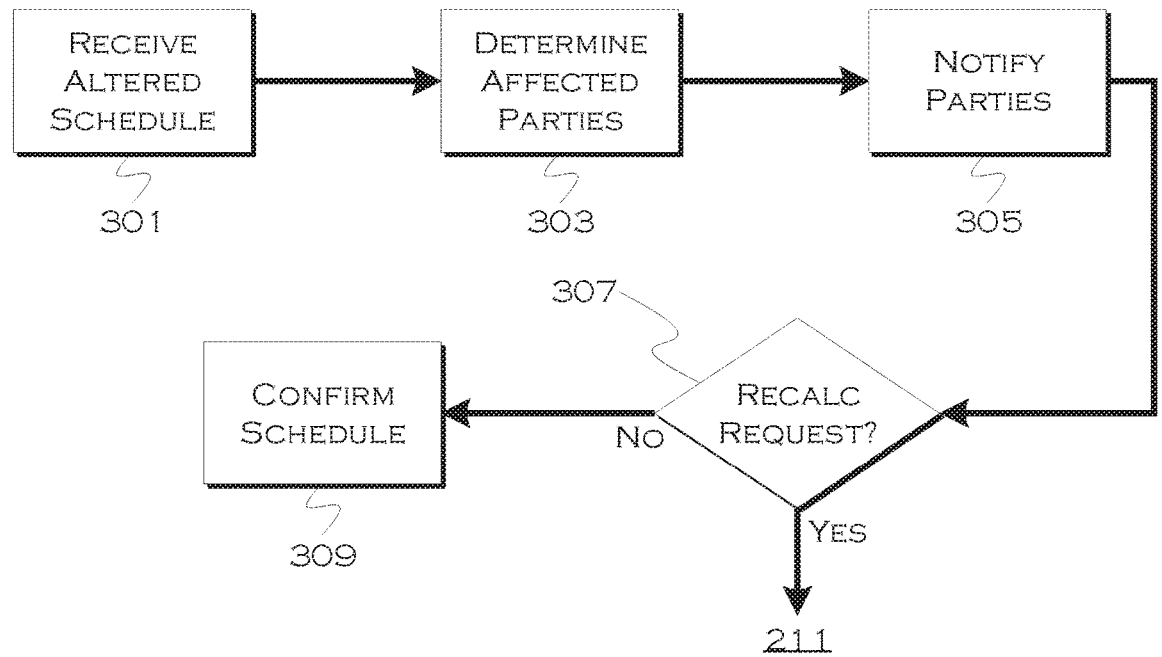
FIG. 3 shows an illustrative schedule-modification process.

FIG. 3 shows an illustrative schedule-modification process. In this example, a previously set vehicle schedule may have been modified to accommodate additional, later requests. In such a scenario, the other riders may be affected in their pick-up and drop-off times. For example, the first user requesting a vehicle may have a precise time window corresponding exactly to a requested window, but as the vehicle adds planned pick-ups the window may change, narrowing or broadening. Modeling can help predict likely variances so that windows can be loosely accurate even initially, and real-world conditions can be fed back into the model to further accommodate what actually occurs as the plan according to the modeling executes over time. Thus, even if a sole rider requests a vehicle, the system may be able to predict that the rider will likely eventually have two companions, and the initial window can accommodate this prediction, even if those companions are not yet actually on the schedule.

Some schedules may also have a cut-off time, wherein the rider(s) know that the schedule is fixed by a certain time. This is another example of a client-adjustable constraint/ parameter, wherein different clients may allow different customers to request up until the last minute, or no more than two hours before pick-up, etc.

If the system alters a schedule for a given vehicle, this process may receive 301 the altered schedule and determine 303 which parties (other riders) are affected. This could include riders picked up both before and after the new user, because earlier pickup windows might also change to accommodate additional users being picked-up later, depending on how far off-route (from the current route) the new pick-up location lies. The process can notify 305 the affected parties with new windows and/or walking requirements. The system could even attempt to move certain parties to a different vehicles, if the current proposed alterations exceed client constraints, for example.

If the new schedule does not work optimally for a given user, that user may request 307 a new plan. If the user requests recalculation, or a new departure time or other parameter, the system may proceed to treat that user as a new user, temporarily reserving the old position if the new request cannot be serviced, but trying to find a new pickup time for a given user that meets the new constraints specified by that user in response to the schedule alteration. If all users agree to the new schedule, the process can confirm the schedule 309. A client may also specify a maximum daily, weekly, etc. number of times that a user may be requested to change a window, so that certain clients have assurances that a user will not constantly be requested to re-plan their pick-up.

Figure 4:
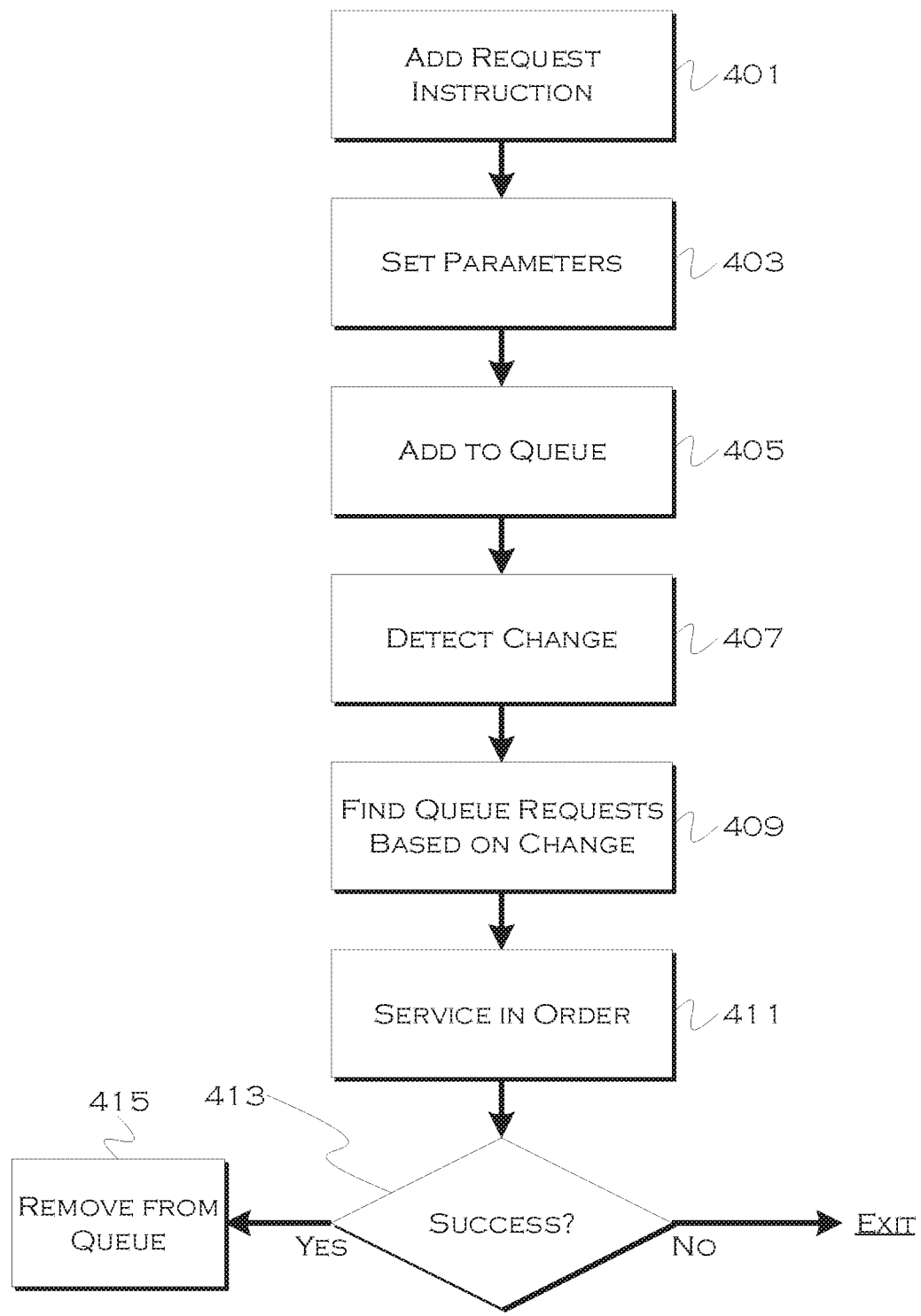
FIG. 4 shows an illustrative queue-servicing process.

FIG. 4 shows an illustrative queue-servicing process. In this example, the process receives 401 a request which cannot be serviced, and will be adding the request to a queue. Because the queue can be highly complex, based on a number of requests, and because it may not make sense to service the whole queue on a first in first out basis, the process adds 403, in this example, some parameters to the request. These parameters are useful for later dequeuing, when the process needs to select a possible queue member for servicing.

Since the general desire is often to serve as many requests as possible, as fast as possible, the process may want to constantly attempt to service the queue of unserved requests. This could potentially take some heavy processing, if each queue member was reconsidered, on a constant basis, each time a change to any schedule was made (because that change could potentially change a determination with regards to a queue member). For example, if one user cancelled a slot, and there were several queue requests that were serviceable, the process might have to run through the calculations on a vast number of queued requestors in order to find this result. In this example, the requestors have parameters saved therewith, which indicates, for example, what time the requestor wants to be picked up. So if the cancellation opens a 20 minute window between 8:30 and 8:50, the process can check only the people who might actually want or need a ride in that time window.

The request is added 405 to the queue with the relevant sort-assisting parameters associated therewith. If the process detects 407 a change to vehicle availability (cancellation, varied route, etc), the process may find 409 relevant queue requestors who may benefit from this change. These requestors may still be served 411 in FIFO (or any other) order, but the process only has to consider queue members who may actually be able to be served by the new vehicle opportunity, without running calculations on the whole queue.

If the process finds 413 a relevant requestor who can be serviced by the new opportunity, the process may then remove 415 that person from the queue and add them to a scheduled route. This allows a process to keep an ordered queue, service the queue and also save processing time/cycles by creating queue efficiencies. This is certainly not the only way to service a queue, but may be one useful example, especially if the queue grows large due to limited resources and high request volume.

Figure 5:
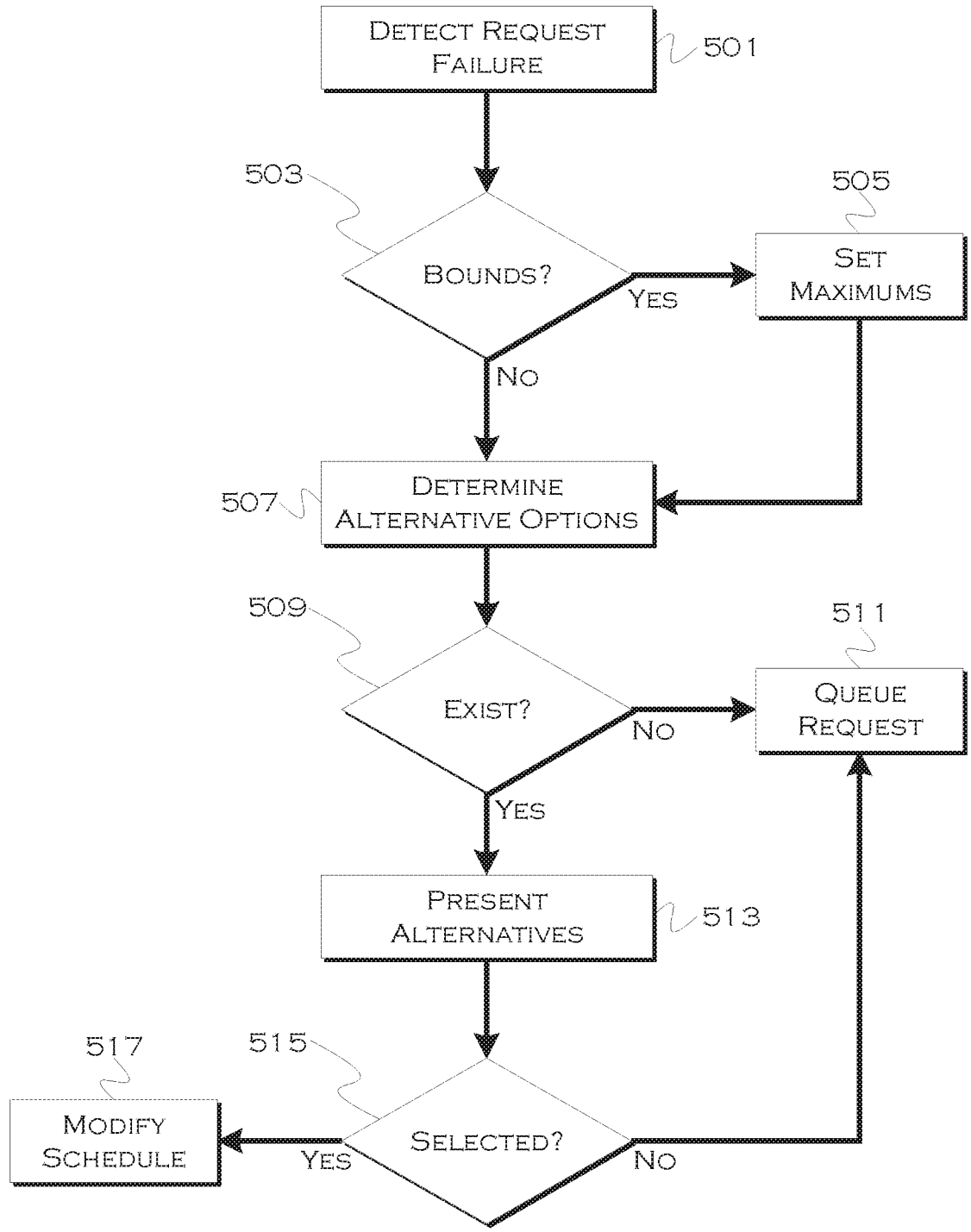
FIG. 5 shows an illustrative suggestion process.

FIG. 5 shows an illustrative suggestion process. In this example, the process detects 501 that a request has failed to be served. If the system is zero-reject, or if the system simply wants to maximize resource usage, the system may determine if the request is currently bounded 503 in a defined manner. For example, a user may say "I want to leave at 8:15, but I can leave no earlier than 7:00 and no later than 8:45." These bounds may be observed over time, included in the request, or set as user parameters in a user profile. The system will not necessarily use these bounds to service the initial request, instead, for example, targeting a 10-minute window around the preferred departure time. But, if the request cannot be serviced, the process may then attempt to find alternatives within the bounds.

If there are no user-defined bounds, the process may set 505 some defined bounds based on client-defined maximums. For example, it may not be typically useful to suggest a departure more than 2 hours after a request, unless a system is designed to service very flexible users. So, in the interest of reasonable seeming suggested alternatives, the client may artificially bound the suggestions. In some examples, such as those serving the wheel-chair community, the client may be prohibited from rejecting requests. Since there are still limited resources to service such a community, the process may not bound the suggestion, because while the request may not be rejectable, servicing every single request within a constrained time window may also be a physical impossibility, based on the number of vehicles available and how far the vehicles have to travel.

Using the new, wider bounds (if they exist), the process may determine 507 alternative options for alternative departure times (or walking distances, for example, if a user can be told that a 10-minute walk will result in an on-time pickup). If there are not 509 existing alternatives, the process can queue the original request, and service the queue in accordance with a dequeuing procedure as needed.

If there are alternatives, the process can present 513 those alternatives to a requesting user device, and if the user selects 515 one of the alternatives, the new proposed schedule can be confirmed 517 to accommodate the new user at the suggested and confirmed time. Otherwise, the process can queue the user for later servicing.

By creating client-specific models based on client parameters, the illustrative examples can provide an improved routing system for multiple vehicle-assets, which can accommodate both scheduled and on-demand pickups and which can adapt to both changing needs and different users. Clients using the system, and the like, can create a specialized, tunable model for request servicing, and can adapt their business and model to changing demands without having to rebuild a routing engine for a modified demand.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive requirement values, from a vehicle-providing entity, for a plurality of predefined tunable routing parameters;
select and assign entity associated routing parameter bounding that defines, for a solution for the specific entity, which parameters should bound possible solutions before other of the parameters, based on a search schema devised through simulations based on the received requirement values to produce route-planning results meeting entity-defined requirement values of consideration-levels for each parameter;
receive a plurality of pick-up requests; and
determine, using the search schema bounded by the bounding, a routing-plan for a plurality of vehicles to service the requests such that the received requirement values are met.

2. The system of claim 1, wherein the requirement values specify a maximum percentage of request rejections.

3. The system of claim 1, wherein the requirement values specify a maximum window of time around a requested pickup-time.

4. The system of claim 1, wherein the requirement values specify whether the routing-plan will accommodate on-demand requests, pre-scheduled requests or both.

5. The system of claim 1, wherein the requirement values specify a cut-off time limit for changing a pre-scheduled request.

6. The system of claim 1, wherein the requirement values specify a maximum load time.

7. The system of claim 1, wherein the requirement values specify a maximum deviance from a planned route for a new pickup.

8. The system of claim 1, wherein the requirement values specify a maximum wait time for on-demand request servicing.

9. A system comprising:
a processor configured to:
receive first requirement values, from a first vehicle-providing entity, for a plurality of predefined tunable routing parameters, the first values including at least one entity capability for a parameter corresponding to the capability;
search for possible responses for a plurality of simulated vehicle requests input into a simulated a request-fulfilment system having capabilities matching the at least one capability received from the first entity, to determine which search strategies for possible responses result in solutions that fail at least one entity-defined requirement value of the first requirement values defined by the first entity;
determine, based on the search for possible responses, a plurality of search constraints that prevent consideration of at least portions of search strategies that result in responses failing to meet at least one entity-defined requirement of the first requirement values defined by the first entity;
devise an first, entity-specific search and fulfilment algorithm for the first entity that prevents, pursuant to the determined search constraints, searching certain possible responses to a request;
receive a plurality of first pick-up requests from customers of the first entity; and
determine, using the first entity-specific search and fulfilment algorithm, a routing-plan for a plurality of vehicles to service the first requests.

10. The system of claim 9, wherein the processor is further configured to:
receive second requirement values, from a second vehicle-providing entity, for a plurality of predefined tunable routing parameters, the second values different from the first values in at least one aspect;
repeat the search, determination and devising for the second entity based on the second requirement values to devise a second search and fulfilment algorithm different from the first search and fulfilment algorithm in at least one search constraint and for the second entity;
receive a plurality of second pick-up requests from customers of the second entity; and
determine, using the second entity-specific search and fulfilment algorithm, a routing-plan for a plurality of vehicles to service the second requests.

* * * * *